US012647849B2

(12) United States Patent
    Pirmagomedov et al.

(10) Patent No.:      US 12,647,849 B2
(45) Date of Patent:           Jun. 2, 2026

(54) DATA FORWARDING IN A WIRELESS NETWORK WITH INTEGRATED ACCESS AND BACKHAUL, IAB, AND DISAGGREGATED ACCESS NODES

(71) Applicant: Nokia Technologies Oy, Espoo (FI)

(72) Inventors: Rustam Pirmagomedov, Oulu (FI); Ilkka Antero Keskitalo, Oulu (FI); Ingo Viering, Munich (DE); Rauli Jarkko Kullervo Järvelä, Oulu (FI)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 18/566,903

(22) PCT Filed: May 19, 2022

(86) PCT No.: PCT/EP2022/063512
    § 371 (c)(1),
    (2) Date: Dec. 4, 2023

(87) PCT Pub. No.: WO2023/285016
    PCT Pub. Date: Jan. 19, 2023

(65) Prior Publication Data
    US 2024/0276317 A1      Aug. 15, 2024

(30) Foreign Application Priority Data
    Jul. 16, 2021      (FI) ..................................... 20215813

(51) Int. Cl.
    *H04W 36/00*          (2009.01)
    *H04W 36/02*          (2009.01)
    (Continued)
(52) U.S. Cl.
    CPC ..... *H04W 36/0061* (2013.01); *H04W 36/023* (2013.01); *H04W 36/08* (2013.01);
    (Continued)

(58) Field of Classification Search
    CPC ........... H04W 36/0061; H04W 36/023; H04W 36/08; H04W 36/087; H04W 40/36;
    (Continued)

(56) References Cited

U.S. PATENT DOCUMENTS

2020/0245223 A1 *   7/2020   Cheng ................... H04W 40/12
2021/0058826 A1      2/2021   Mao et al.
                                        (Continued)

FOREIGN PATENT DOCUMENTS

CN           112865943 A      5/2021
WO       2018/203734 A1      11/2018
                        (Continued)

OTHER PUBLICATIONS

"3rd Generation Partnership Project; Technical Specification Group Radio Access Network; NR; Backhaul Adaptation Protocol (BAP) specification (Release 16)", 3GPP TS 38.340, V16.4.0, Mar. 2021, pp. 1-22.
                        (Continued)

*Primary Examiner* — Cheikh T Ndiaye
(74) *Attorney, Agent, or Firm* — Lippes Mathias LLP

(57)                ABSTRACT

Certain examples of the present disclosure relate to a first node (401) comprising means for: receiving data addressed to the first node, wherein the received data comprises information to be transmitted to a User Equipment, UE (110); determining, in response to determining that the first node does not serve the UE, an address of a second node (402) that serves the UE; and sending, based at least in part on the determined address of the second node, the received data to the second node.

20 Claims, 8 Drawing Sheets

HO from IAB#3 to IAB#4

402  110                        401        BAP PDU to          BAP PDU to
                                            IAB#3 for UE1      IAB#3 for UE1

IAB#4            IAB#3        IAB#2        IAB#1            Donor
        UE1                                                            300

304          303          302          301        BAP PDU
                                                      to IAB#4
⟶ Packet flow *after* the handover                      for UE1
⟶ Packet flow *before* the handover

(51) Int. Cl.
    *H04W 36/08*         (2009.01)
    *H04W 40/36*         (2009.01)
    *H04W 88/08*         (2009.01)
(52) U.S. Cl.
    CPC ......... *H04W 36/087* (2023.05); *H04W 40/36*
        (2013.01); *H04W 88/08* (2013.01)
(58) Field of Classification Search
    CPC . H04W 88/08; H04W 84/047; H04W 88/085;
        H04W 40/00; H04W 40/04; H04W
        40/248
    See application file for complete search history.

(56)            References Cited

U.S. PATENT DOCUMENTS

| | | | | |
|---|---|---|---|---|
| 2021/0152515 A1 | 5/2021 | Akl et al. | | |
| 2021/0227435 A1* | 7/2021 | Hsieh | .................. | H04W 36/087 |
| 2023/0247495 A1* | 8/2023 | Teyeb | ............... | H04W 36/0072 |
| | | | | 370/331 |

FOREIGN PATENT DOCUMENTS

| | | | | | |
|---|---|---|---|---|---|
| WO | WO-2020035645 A1 * | 2/2020 | .......... | H04W 36/083 |
| WO | 2020/166912 A1 | 8/2020 | | |
| WO | 2020/168120 A1 | 8/2020 | | |
| WO | 2020/191768 A1 | 10/2020 | | |
| WO | 2021/006691 A1 | 1/2021 | | |
| WO | 2022/038308 A1 | 2/2022 | | |
| WO | 2022/073185 A1 | 4/2022 | | |

OTHER PUBLICATIONS

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"Handling of In-flight Packets During Handover in IAB Networks", 3GPP TSG-RAN WG3 Meeting #109-e, R3-205223, Agenda: 13.2.2, Ericsson, Aug. 17-27, 2020, pp. 1-2.

"Summary of Offline Discussion on IAB Multi-Hop Performance", 3GPP TSG-RAN WG3 #111-e, R3-211205, Agenda: 13.3.2, Huawei, Jan. 25-Feb. 4, 2021, 10 pages.

"Inter-donor-DU local re-routing in IAB", 3GPP TSG-RAN3 Meeting #111-e, R3-210103, Agenda: 13.3.2, CATT, Jan. 25-Feb. 4, 2021, 3 pages.

"Discussion on inter-donor-DU local re-routing in Rel-17 IAB", 3GPP TSG-RAN WG3 Meeting #111e, R3-210221, Agenda: 13.3.2, Samsung, Jan. 25-Feb. 4, 2021, 2 pages.

"Inter-donor-DU local rerouting for IAB", 3GPP TSG-RAN WG3 Meeting #111-e, R3-210351, Agenda: 13.3.2, Qualcomm Incorporated, Jan. 25-Feb. 5, 2021, pp. 1-3.

"Discussion on Inter-Donor-DU re-routing", 3GPP TSG-RAN WG3 Meeting #111-e, R3-210491, Agenda: 13.3.2, Nokia, Jan. 25-Feb. 4, 2021, 2 pages.

"Inter-donor-DU re-routing for IAB", 3GPP TSG-RAN WG3 Meeting #111-e, R3-210551, Agenda: 13.3.2, Huawei, Jan. 25-Feb. 4, 2020, 2 pages.

"Discussion on IAB packet rerouting", 3GPP TSG-RAN WG3 Meeting #111-e, R3-210616, Agenda: 13.3.2, Lenovo, Jan. 25-Feb. 5, 2021, pp. 1-3.

"Considerations on inter-donor-DU re-routing", 3GPP TSG-RAN WG3 Meeting #111 electronic, R3-220719, Agenda: 13.3.2, ZTE, Jan. 25-Feb. 4, 2021, 3 pages.

"Summary of [Post114-e][075][eIAB] Open Issues on Re-routing", 3GPP TSG-RAN WG2 Meeting #115 electronic, R2-21XXX, Agenda: 8.4, Huawei, Aug. 16-27, 2021, pp. 1-13.

"LS on inter-donor-DU re-routing", 3GPP TSG-RAN WG3#111-e, R3-211298, RAN3, Jan. 25-Feb. 4, 2021, 1 page.

"The mobility in IAB", 3GPP TSG-RAN WG2 Meeting #103, R2-1812673, Agenda: 11.1.3, Potevio, Aug. 20-24, 2018, pp. 1-4.

Office action received for corresponding Finnish Application No. 20215813, dated Feb. 2, 2022, 13 pages.

"3rd Generation Partnership Project; Technical Specification Group Radio Access Network; NG-RAN; F1 application protocol (F1AP) (Release 16)", 3GPP TS 38.473, V16.5.0, Apr. 2021, pp. 1-463.

Office action received for corresponding Finnish Application No. 20215813, dated Jun. 13, 2022, 13 pages.

Invitation to Pay Additional Fees received for corresponding Patent Cooperation Treaty Application No. PCT/EP2022/063512, dated Sep. 19, 2022, 14 pages.

"Inter-donor-DU rerouting and local rerouting for R17-IAB", 3GPP TSG-RAN WG2 Meeting #114-e, R2-2106278, Agenda: 8.4.3, Huawei, May 19-27, 2021, 6 pages.

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NG-RAN; Architecture description (Release 16)", 3GPP TS 38.401, V16.6.0, Jul. 2021, pp. 1-79.

International Search Report and Written Opinion received for corresponding Patent Cooperation Treaty Application No. PCT/EP2022/063512, dated Nov. 10, 2022, 21 pages.

Office action received for corresponding Finnish Application No. 20215813, dated Oct. 13, 2023, 14 pages.

* cited by examiner

HO from IAB#3 to IAB#4

402    110

401

BAP PDU to
IAB#3 for UE1

BAP PDU to
IAB#3 for UE1

IAB#4          IAB#3          IAB#2          IAB#1          Donor

UE1

304          303          302          301          300

BAP PDU
to IAB#4
for UE1

⟶ Packet flow *after* the handover

⟶ Packet flow *before* the handover

500

Receive data addressed to 1ˢᵗ IAB node          501

Determine address of 2ⁿᵈ IAB node          502

Send data to 2ⁿᵈ IAB node          503

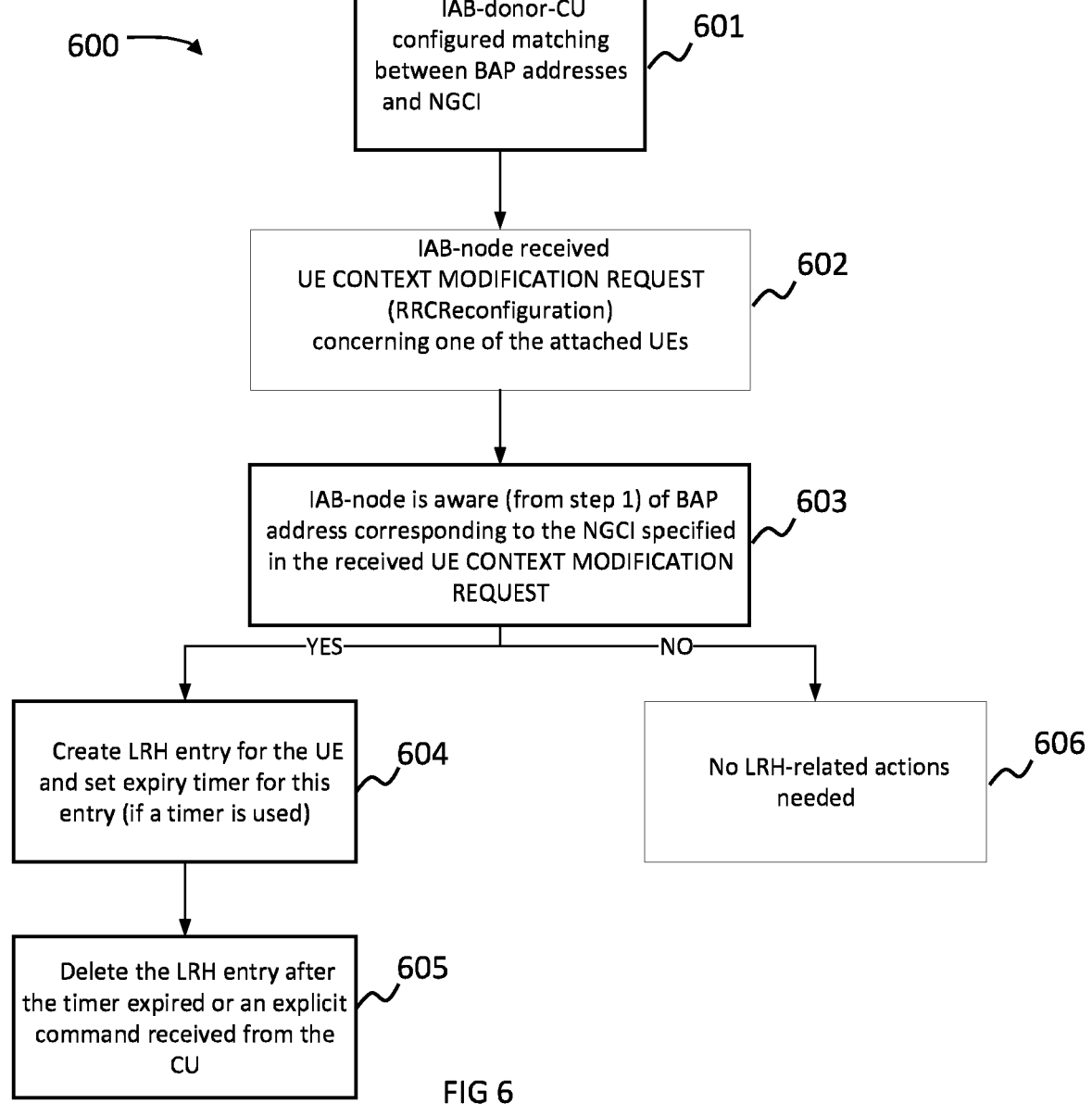

600

601 IAB-donor-CU configured matching between BAP addresses and NGCI

602 IAB-node received UE CONTEXT MODIFICATION REQUEST (RRCReconfiguration) concerning one of the attached UEs

603 IAB-node is aware (from step 1) of BAP address corresponding to the NGCI specified in the received UE CONTEXT MODIFICATION REQUEST

—YES—

—NO—

604 Create LRH entry for the UE and set expiry timer for this entry (if a timer is used)

606 No LRH-related actions needed

605 Delete the LRH entry after the timer expired or an explicit command received from the CU

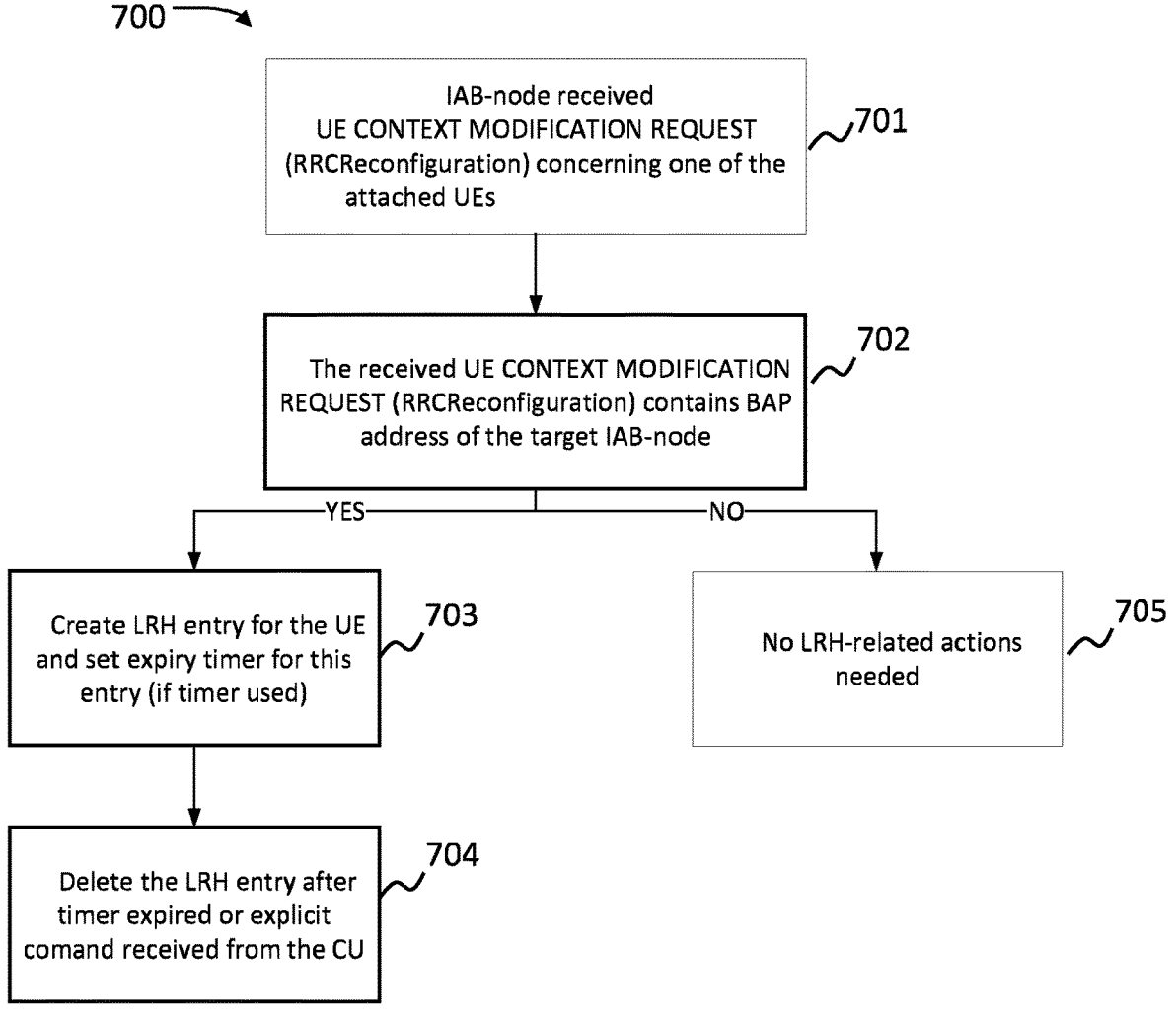

IAB-node received
UE CONTEXT MODIFICATION REQUEST
(RRCReconfiguration) concerning one of the
attached UEs                                701

The received UE CONTEXT MODIFICATION
REQUEST (RRCReconfiguration) contains BAP
address of the target IAB-node              702

————YES————                    ————NO————

Create LRH entry for the UE
and set expiry timer for this    703
entry (if timer used)

No LRH-related actions           705
needed

Delete the LRH entry after
timer expired or explicit        704
comand received from the CU

IAB-node received a
BAP PDU addressed to it ∿801

Does the data (i.e., PDCP PDU)
encapsulated in the BAP PDU is addressed to
the UE which is currently attached to this IAB-
node? ∿802

—YES— —NO—

Deliver the data to the UE 803 ∿

YES

Does LRH contains a
matching entry for this UE? ∿804

NO

Forward the PDU towards
the target IAB-node specified
in LRH ∿805

Discard the
PDU ∿806

IAB#4

IAB#2 IAB#1 Donor

IAB#3

HO from IAB#3 to IAB#4
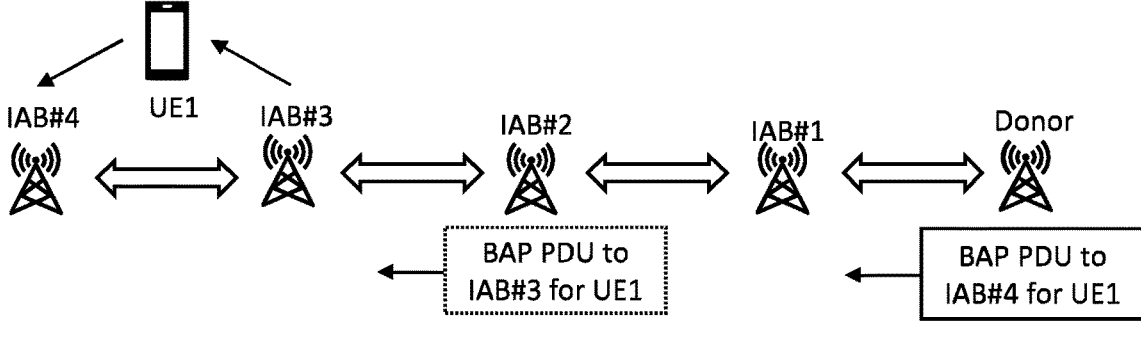
FIG 12
HO from IAB#3 to IAB#4
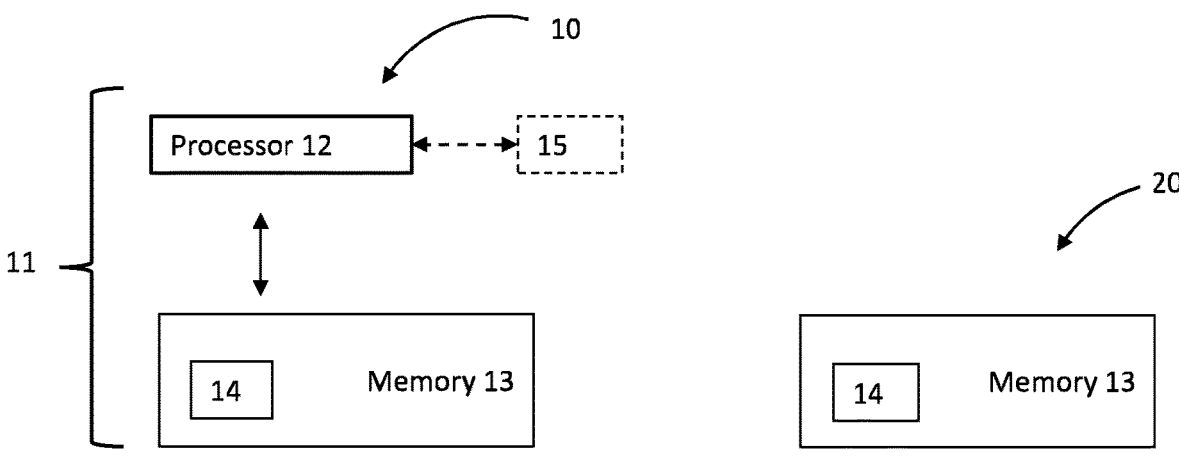
⟶ Packet flow *after* the handover
⋯⋯▷ Packet flow *before* the handover
FIG 13
FIG 14
FIG 15

DATA FORWARDING IN A WIRELESS NETWORK WITH INTEGRATED ACCESS AND BACKHAUL, IAB, AND DISAGGREGATED ACCESS NODES

RELATED APPLICATION

This application was originally filed as PCT Application No. PCT/EP2022/063512, filed on May 19, 2022, which claims priority from FI application No. 20215813, filed on Jul. 16, 2021, each of which is incorporated herein by reference in its entirety.

TECHNOLOGICAL FIELD

Examples of the present disclosure relate to data communication. Some examples, though without prejudice to the foregoing, relate to apparatuses, methods and systems for forwarding data packets during intra-gNB-Centralized Unit, CU, mobility in deployment scenarios where the gNB-CU uses Integrated Access and Backhaul, IAB, functionality.

BACKGROUND

During conventional intra-gNB-CU mobility in a Radio Access Network, RAN, a User Equipment, UE, moves from one cell of a gNB-CU to another cell of the gNB-CU. During conventional intra-gNB-CU mobility, a gNB-Distributed Unit, DU of the gNB-CU that currently serves the UE hands over the serving of the UE to a new gNB-DU of the gNB-CU that is to start serving the UE. An intra-gNB-CU Handover, HO, procedure (also referred to as an inter-gNB-DU HO procedure) is carried out to effect intra-gNB-CU mobility (also referred to as inter-gNB-DU mobility).

In certain deployment scenarios, a gNB may make use of IAB. In such deployment scenarios, the gNB comprises an IAB-donor node (comprising a gNB-CU and a gNB-DU) and one or more IAB nodes (referred to as IAB-DU) that perform only DU functions, whilst CU functions are hosted by the IAB-donor node. Each IAB-DU may be considered as a normal cell from the perspective of a UE.

Conventional intra-gNB-CU (inter-gNB-DU) HO procedures are not always optimal, for instance such as for gNB deployment scenarios employing IAB.

In some circumstances it can be desirable to provide improved data communication. In some circumstances it can be desirable to provide improved data communication via IAB nodes. In some circumstances it can be desirable to provide improved intra-gNB-CU (inter-gNB-DU) HO procedures in deployment scenarios employing IAB. In some circumstances it can be desirable to provide improved HO procedures between IAB-DUs. In some circumstances it can be desirable to provide reduce latency and network resources for data communication via IAB nodes during HO/UE mobility between IAB-DUs.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any embodiments/examples and features described in this specification that do not fall under the scope of the independent claims are to be interpreted as examples useful for understanding various embodiments of the invention.

According to at least some examples of the disclosure there is provided a first node comprising means for:

receiving data addressed to the first node, wherein the received data comprises information to be transmitted to a User Equipment, UE;

determining, in response to determining that the first node does not serve the UE, an address of a second node that serves the UE; and sending, based at least in part on the determined address of the second node, the received data to the second node.

According to various, but not necessarily all, examples of the disclosure there is provided a method comprising:

receiving data addressed to a first node, wherein the received data comprises information to be transmitted to a User Equipment, UE;

determining, in response to determining that the first node does not serve the UE, an address of a second node that serves the UE; and sending, based at least in part on the determined address of the second node, the received data to the second node.

According to various, but not necessarily all, examples of the disclosure there is provided a chipset comprising processing circuitry configured to perform the above-mentioned method.

According to various, but not necessarily all, examples of the disclosure there is provided a module, a device, an Integrated Access and Backhaul, IAB, node, a node of a Radio Access Network, RAN, and/or a system comprising means for performing the above-mentioned method.

According to various, but not necessarily all, examples of the disclosure there is provided computer program instructions for causing an apparatus to perform:

receiving data addressed to a first node, wherein the received data comprises information to be transmitted to a User Equipment, UE;

determining, in response to determining that the first node does not serve the UE, an address of a second node that serves the UE; and sending, based at least in part on the determined address of the second node, the received data to the second node.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

receiving data addressed to a first node, wherein the received data comprises information to be transmitted to a User Equipment, UE;

determining, in response to determining that the first node does not serve the UE, an address of a second node that serves the UE; and sending, based at least in part on the determined address of the second node, the received data to the second node.

According to various, but not necessarily all, examples of the disclosure there is provided a non-transitory computer readable medium encoded with instructions that, when performed by at least one processor, causes at least the following to be perform:

receiving data addressed to a first node, wherein the received data comprises information to be transmitted to a User Equipment, UE;

determining, in response to determining that the first node does not serve the UE, an address of a second node that serves the UE; and sending, based at least in part on the determined address of the second node, the received data to the second node.

According to at least some examples of the disclosure there is provided a centralized unit of an access node for use in a disaggregated architecture comprising at least the centralized unit and a distributed unit, the centralized unit comprising means configured to cause:

sending, to a first node, an indication of an association of an address of a second node and:

either a cell identifier of the second node, or a UE to be handed over to the second node.

According to various, but not necessarily all, examples of the disclosure there is provided a method comprising:

sending, to a first node, an indication of an association of an address of a second node and:

either a cell identifier of the second node, or a UE to be handed over to the second node.

According to various, but not necessarily all, examples of the disclosure there is provided a chipset comprising processing circuitry configured to perform the above-mentioned method.

According to various, but not necessarily all, examples of the disclosure there is provided a module, a device, a node of a Radio Access Network, RAN, and/or a system comprising means for performing the above-mentioned method.

According to various, but not necessarily all, examples of the disclosure there is provided computer program instructions for causing an apparatus to perform:

sending, to a first node, an indication of an association of an address of a second node and:

either a cell identifier of the second node, or a UE to be handed over to the second node.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

sending, to a first node, an indication of an association of an address of a second node and:

either a cell identifier of the second node, or a UE to be handed over to the second node.

According to various, but not necessarily all, examples of the disclosure there is provided a non-transitory computer readable medium encoded with instructions that, when performed by at least one processor, causes at least the following to be perform:

sending, to a first node, an indication of an association of an address of a second node and:

either a cell identifier of the second node, or a UE to be handed over to the second node.

The following portion of this 'Brief Summary' section describes various features that can be features of any of the examples described in the foregoing portion of the 'Brief Summary' section. The description of a function should additionally be considered to also disclose any means suitable for performing that function.

In some examples, the first node can be a first Integrated Access and Backhaul, IAB, node and the second node can be a second IAB node.

In some but not necessarily all examples, the data can be received following initiation of a handover of the UE from the first IAB node to the second IAB node.

In some but not necessarily all examples, the address of the first IAB node to which the data is addressed and the address of the second IAB node can comprise one or more selected from the group of:

Backhaul Adaptation Protocol, BAP, addresses; and

BAP routing identifiers.

In some but not necessarily all examples, the data can comprise one or more selected from the group of:

at least one data packet;

at least one Protocol Data Unit, PDU, of a Backhaul Adaptation Protocol, BAP;

at least one BAP data packet; and a BAP layer encapsulation of the information to be transmitted to the UE.

In some but not necessarily all examples, sending the received data to the second IAB node can comprise one or more selected from the group of:

modifying a destination address of the received data;

modifying a Backhaul Adaptation Protocol, BAP, routing identifier of the received data;

modifying a Backhaul Adaptation Protocol, BAP, header of the received data;

forwarding the received data to the second IAB node to transmit the information to the UE;

forwarding the received data to the second IAB node via a wireless backhaul link; and forwarding the received data to the second IAB node via Backhaul, BH, Radio Link Control, RLC, channel.

In some but not necessarily all examples, the first IAB node can comprise means for:

receiving an indication of an association of the address of the second IAB node and a cell identifier of the second IAB node; and storing, based at least in part on the received indication, information indicative of an association between the address of the second IAB node and the cell identifier of the second IAB node.

In some but not necessarily all examples, the indication of an association of the address of the second IAB node and the cell identifier of the second IAB node can be received by the first IAB node via one or more selected from the group of:

at least one message of an F1 setup procedure;

at least one message of an F1 Application Protocol;

at least one routing configuration message;

at least one routing update message; and at least one BAP Routing ID message.

In some but not necessarily all examples, the first IAB node can comprise means for:

receiving an indication that the UE is to be handed over from the first IAB node to the second IAB node; and storing, based at least in part on the received indication, information indicative of an association between the UE and the second IAB node.

In some but not necessarily all examples, the first IAB node can comprise means for:

receiving an indication of an association of the UE and the address of the second IAB node; and storing, based at least in part on the received indication, information indicative of an association between the UE and the address of the second IAB node.

In some but not necessarily all examples, the indication of an association of the UE and the address of the second IAB node can be received by the first IAB node via one or more selected from the group of:

at least one message of a UE handover procedure; and at least one UE CONTEXT MODIFICATION REQUEST message.

In some but not necessarily all examples, the determining of the address of the second IAB node can be based at least in part on the stored information.

In some but not necessarily all examples, the first IAB node can comprise means for determining to remove the stored information based at least in part on one or more selected from the group of:

an elapse of a predefined or dynamically determined time duration;

a current load in a network to which the first IAB node belongs; and receipt of a control signal for removing the stored one or more entries.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which:

FIG. 6 shows another example of the subject matter described herein;

FIG. 7 shows another example of the subject matter described herein;

FIG. 12 shows another example of the subject matter described herein;

FIG. 13 shows another example of the subject matter described herein;

FIG. 14 shows another example of the subject matter described herein; and

FIG. 15 shows another example of the subject matter described herein.

Figure 1:
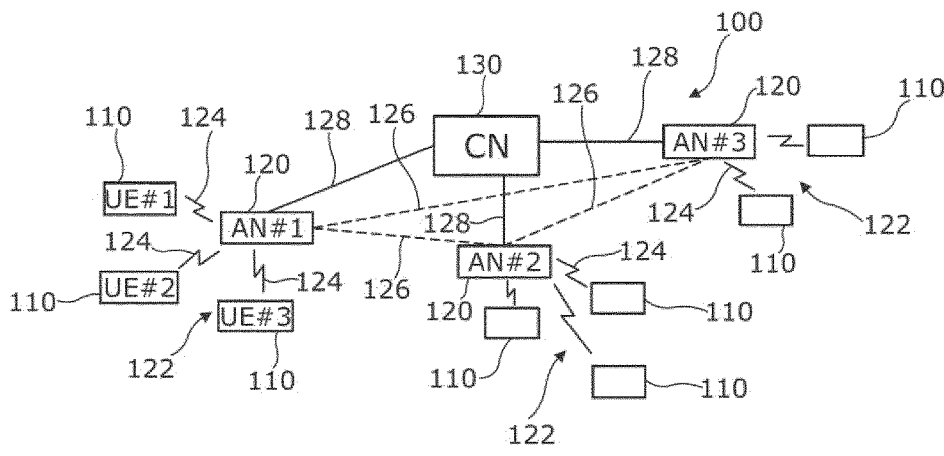
FIG. 1 shows an example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

ABBREVIATIONS/DEFINITIONS

BAP Backhaul Adaptation Protocol
BH Backhaul
CGI Cell Global Identity
CU Centralized Unit
DL Downlink
DU Distributed Unit
gNB gNodeB
HO Handover
IAB Integrated Access and Backhaul
ID Identifier
IE Information Element
LRH List of Recent Handovers
MT Mobile Termination
NR New Radio
PDCP Packet Data Convergence Protocol
PDU Packet Data Unit
RAN Radio Access Network
RLC Radio Link Control
RRC Radio Resource Configuration
UE User Equipment
UL Uplink

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology-Dual Connection (MR-DC), not least for example such as:

Evolved Universal Terrestrial Radio Access—New Radio Dual Connectivity (EUTRA-NR-DC, also referred to as EN-DC),
    New Radio—Evolved Universal Terrestrial Radio Access Dual Connectivity (NR-EUTRA-DC, also referred to as NE-DC),
    Next Generation Radio Access Network Evolved Universal Terrestrial Radio Access-New Radio Dual Connectivity (NG-RAN E-UTRA-NR Dual Connectivity, also referred to as NGEN-DC), or
    New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes

120 are the network termination of a radio link. An access node 120 can be implemented as a single network equipment, or disaggregated/distributed over two or more RAN nodes, such as a central unit (CU), a distributed unit (DU), a remote radio head-end (RRH), using different functional-split architectures and different interfaces.

In the following description, an access node will be referred to as gNB 120 and a terminal node 110 will be referred to as a UE 110.

Figure 2:
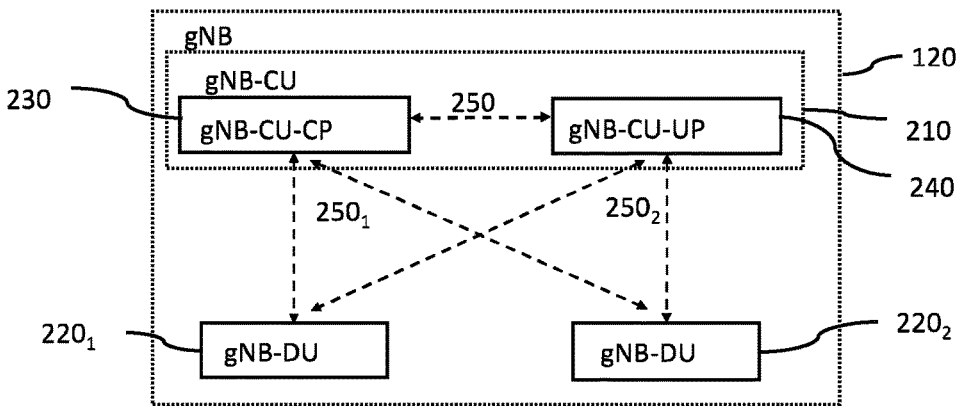
FIG. 2 shows another example of the subject matter described herein.

FIG. 2 illustrates an example of an access node 120 (e.g., gNB). In this example, the access node has a disaggregated (split) architecture. The gNB 120 comprises one or more distributed units (gNB-DU) 220 and a centralized unit (gNB-CU) 210.

The gNB-CU 210 is a logical node configured to host a Radio Resource Connection (RRC) layer and other layers of the gNB 120. The gNB-CU 210 controls the operation of one or more gNB-DUs 220. The gNB-DU 220 is a logical node configured to host Radio Link Control (RLC) protocol layer, Medium Access Control (MAC) layer and Physical (PHY) layer of the access node (gNB) 120. The gNB-DU 220 communicates via a dedicated interface 250 (F1) to the RRC layer hosted by the gNB-CU.

One gNB-DU 220 can support one or multiple cells 122 (not illustrated in the figure). One cell is supported by only one gNB-DU 220.

The gNB-CU 210 and a gNB-DU 220 communicate via a dedicated interface 250, the F1 interface. The F1 interface 250 connects a Radio Resource Connection (RRC) layer hosted by the gNB-CU 210 to the different, lower layers hosted by the gNB-DU 220. The F1 interface functions are divided into F1-Control Plane Function (F1-C) 250₁ and F1-User Plane Function (F1-U) 250₂.

In the following description, a centralized unit of an access node will be referred to as gNB-CU 210, distributed units referred to as gNB-DU 220 and a terminal node 110 will be referred to as a UE 110.

Figure 3:
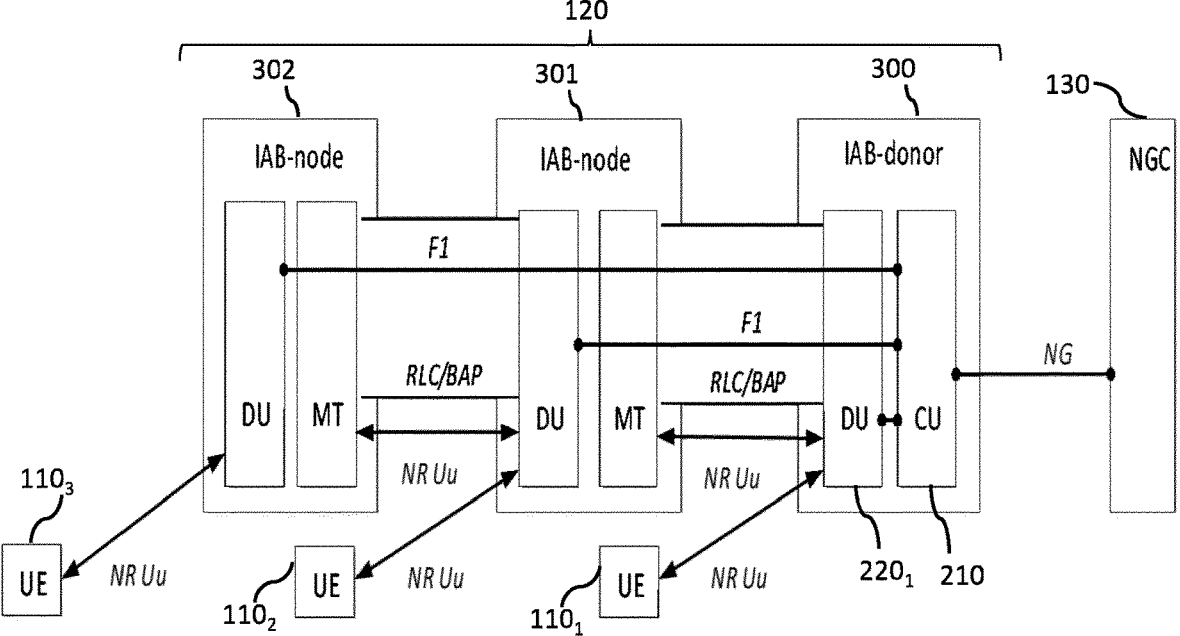
FIG. 3 shows another example of the subject matter described herein.

FIG. 3 illustrates an example of a disaggregated (split) architecture gNB 120, in communication with a core node 130, namely New/Next Generation Core (NGC), wherein the gNB employs IAB technology. In effect, an IAB network, comprising a plurality of IAB nodes 300-302, is formed within the disaggregated (split) architecture gNB 120. The each IAB node is wirelessly connected to its parent and child IAB node (if any) via its own respective Backhaul RLC channel and communicates with other IAB nodes via Backhaul Adaptation Protocol, BAP. BAP data is carried by backhaul Radio Link Control, RLC, channels on each backhaul link between each IAB node.

Release 16 of the 3rd Generation Partnership Project, 3GPP standard, provides an option for flexible Radio Access Network, RAN, extension referred to as "Integrated Access and Backhaul"—IAB. This enables cells (each cell comprising a DU of an IAB node 301, 302) to be connected to the core node 130 via a gNB-DU 220₁ and gNB-CU 210 (referred to as an IAB-donor 300) over wireless backhaul.

In New Radio, IAB technology relies on split gNB architecture consisting of a Centralized Unit, CU, 210 and one or more Distributed Units, DUs, 220₁ (only one of which is illustrated in the figure) [TS 38.300]. IAB nodes 301, 302 perform only DU functions, while CU functionality is hosted by the IAB-donor 300. Each IAB-DU (i.e., each DU of an IAB node and DU of an IAB donor) can be considered as a normal cell from the perspective of UEs 110₁-110₃. For an IAB node to communication with its parent node (which can be another IAB node or the IAB-donor), the IAB node hosts a Mobile Termination, MT, function corresponding to the UE operation or a part of the UE operation [3GPP TR 38.874]. There can be multiple hops between the IAB-donor node and an IAB node that serves as an access to a UE. In such case, intermediate IAB node(s) serve as relays. For instance, there are two hops, via an intermediary IAB node 301, from the IAB node 302 (serving UE 110₃) and the IAB-donor node 300.

The currently specified inter-gNB-DU HO procedure (i.e., relating to managing the handing over of a UE from a source gNB-DU to a target gNB-DU within the same gNB-CU, i.e., intra-CU) does not concern itself with nor handle "in-flight" data packets travelling between a CU and a source DU, such as Downlink, DL, data packets from the CU to the source DU. Such "in-flight" data packets correspond to data packets that are in transit and have not yet reached their destination prior to completion of a HO procedure, i.e., such data packets have departed from a source/transmitting entity prior to completion of a HO procedure but have not yet reached the destination/receiving entity prior to completion of the HO procedure.

Typically, in conventional wired deployments of a disaggregated (split) architecture CU and DU (i.e., such wired deployments not involving IAB technology) there is only one hop between the CU and the DU and hence very few in-flight data packets would get caught out by the HO. Accordingly, issues and problems concerning in-flight data packets may be negligible for such conventional wired deployments of a disaggregated (split) architecture CU and DU. Whereas, in wireless deployments of a disaggregated (split) architecture CU and DU, i.e., via an IAB network, there may be multiple hops (IAB relays) between CU and DU (access IAB node). Due to that, a considerable number of packets can be in transit between the CU and the source DU when a UE is performing handover.

Figure 4:
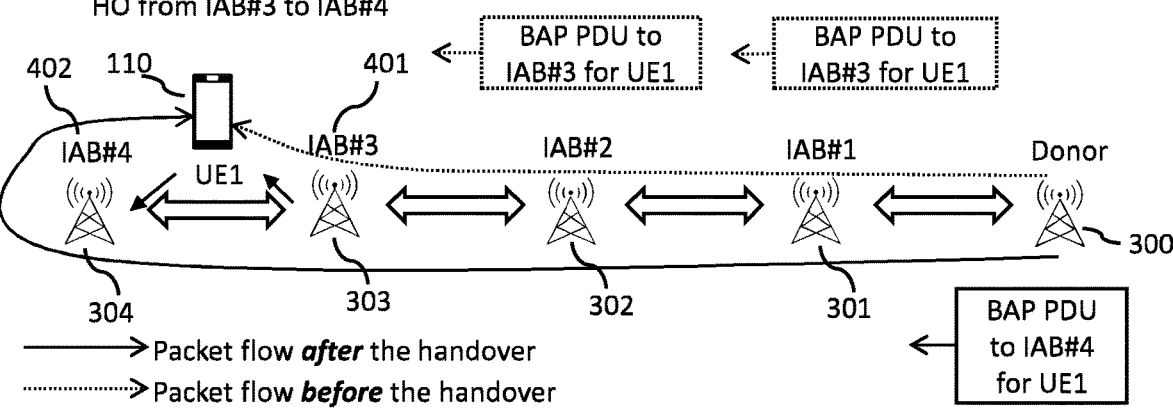
FIG. 4 shows another example of the subject matter described herein.

FIG. 4 illustrates a further example of a disaggregated (split) architecture gNB employing IAB technology and comprising a plurality of IAB nodes #1-#4 301-304 wirelessly connected in series, via backhaul RLC channels on each backhaul link, to an IAB-donor node 300.

In this example, a UE, UE1 110, undergoes a HO from IAB #3 (serving/source DU/IAB node 401) to IAB #4 (target DU/IAB node 402). However, in this example, there are still DL BAP Packet Data Units, PDUs, for UE1 (i.e., the BAP PDU encapsulates data addressed to the UE) that are addressed to UE1's formerly serving IAB #3, that are traveling from the IAB-donor 300 to their destination IAB #3 (i.e., such packets are waiting to be scheduled in buffers of IAB #1 and IAB #2). Such DL BAP PDU's may be referred to as "in-flight" data.

With the present state of the technology [as defined in TS 38.401], and the current inter-DU HO procedure, such BAP data packets would be discarded once they arrive at their destination, i.e., the source IAB #3 because, following the HO to the target IAB #4, UE1 is no longer attached/served by source IAB #3. Further, based on a Downlink Data Delivery Status (DDDS) received by the CU of the IAB-donor 300 from the source IAB-DU of IAB #3, the in-flight packets should be retransmitted by the CU of the IAB-donor towards the target DU of IAB #4. This may cause additional delays due to the retransmitted packets having to travel the entire IAB chain again.

As will be discussed in further detail below, various examples of the enable forwarding of in-flight packets from a source IAB node (which may also be referred to an old/former source IAB node) to a target IAB node (which may also be referred to a new source IAB node), during the intra-CU handover of a UE or after the completion of the intra-CU handover. Such forwarding may be configured at an IAB node by the IAB-donor and used, e.g., if there is a chance that directly forwarded in-flight packet(s) can reach the target IAB node faster than those retransmitted from the IAB donor.

For example, with respect to the IAB network and HO illustrated in FIG. 4, such forwarding may be configured at source IAB #3 by the IAB-donor and used if there is a chance that the source IAB #3 directly forwarding in-flight packet(s) to the target IAB #4 would mean such packets reach the target IAB #4 sooner that if the packets were retransmitted by the IAB-donor and conveyed to IAB #4 via the IAB chain (IAB #1-#3) again.

In some examples, information about recent intra-CU HOs is stored at the source IAB node. Such information may be stored in any suitable data structure, e.g., such as a new data structure called a "List of Recent Handovers", LRH. Such a list may store an identifier, ID, of a UE (i.e., which has recently moved from the source IAB node to another IAB/target IAB node) along with a BAP address of the UE's target IAB node. By associating/pairing the UE ID (e.g., not least the UE's IP address, or session ID) with the BAP address of UE's target IAB node and storing the same at the source IAB node, if an inflight data packet (e.g., BAP PDU) for the UE that is addressed to the (formerly serving) source IAB node subsequently arrives at the source IAB node following a HO; a check can be made by the source IAB to see whether the UE that the inflight data is for is in the LRH. If so, the inflight data is forwarded to BAP address in the LRH associated with the UE so that the inflight date is forwarded to the (currently serving) target IAB node for the target IAB node to then transmit the encapsulated data to the UE.

In some examples, records from LRH can be removed after some predefined time (such a predetermined time could be based on or equal to the expected time required for retransmission of PDUs from the CU) or with an explicit indication from the CU.

Examples of the disclosure may provide the following advantages: reduced latency for delivering in-flight BAP PDUs, reduced network resources and saving capacity of wireless backhaul links. Such advantages may be achieved not least by avoiding, following a HO, BAP PDUs having to be retransmitted from the CU and retransmitted along the IAB chain of nodes to the target IAB; and instead enabling BAP PDUs to be forwarded (i.e., from a position already along the IAB chain) from a (former/old) source IAB node to a target IAB node (i.e., new source IAB node).

Figure 5:
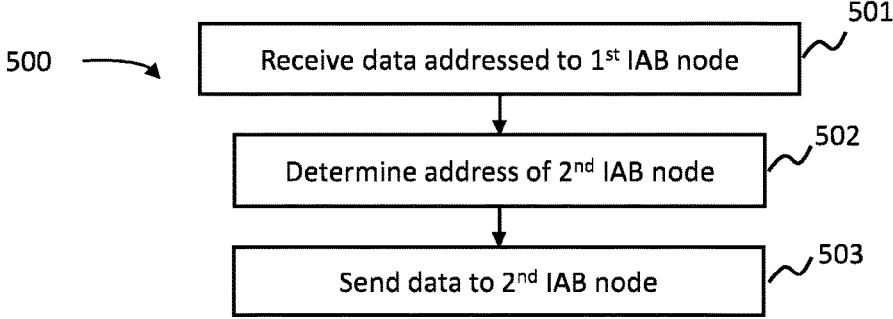
FIG. 5 shows another example of the subject matter described herein.

FIG. 5 illustrates an example of a method 500 according to the present disclosure that performed by a first Integrated Access and Backhaul, IAB, node. The component blocks of FIG. 5 are functional and the functions described can be performed by a single physical entity (such as is described with reference to FIG. 14). The functions described can also be implemented by a computer program (such as is described with reference to FIG. 15).

In block 501, the first IAB node receives data addressed to the first IAB node, wherein the received data comprises information to be transmitted to a User Equipment, UE.

The received data can be one or more selected from the group of:

at least one data packet;
  at least one Protocol Data Unit, PDU, of a Backhaul Adaptation Protocol, BAP;
  at least one BAP data packet; and
  a BAP layer encapsulation of the information to be transmitted to the UE.

The received data can comprises information that was intended to be transmitted to the UE by the first IAB node. For example, the received data can encapsulate data addressed to the UE (e.g., it can encapsulate Packet Data Convergence Protocol, PDCP, PDUs for the UE) that was intended to be transmitted to the UE by the first IAB node (i.e., wherein, at the time the data was initially sent from the IAB donor, the first IAB node was serving/hosting/providing access for the UE. However, by the time the data is actually received by the first IAB node, it may no longer be serving the UE as the UE may have been handed over to another IAB node such as a second IAB node).

The address of the first IAB node to which the data is addressed can comprise one or more selected from the group of:
  at least one address of the first IAB node in an IAB network;
  at least one BAP address;
  at least one routing identifier of the first IAB node in an IAB network; and/or
  at least one BAP routing identifier.

In some examples, the data is received following initiation and/or completion of a handover of the UE from the first IAB node to a second IAB node. In such a manner, the first and second IAB nodes can be, respectively, a source IAB node (such as shown with reference to 401 of FIG. 4) and a target IAB node (such as shown with reference to 402 of FIG. 4) in an intra-gNB-CU (i.e., inter-gNB-DU/inter IAB) handover of the UE (i.e., handover of the UE from the first IAB node to the second IAB node). The first IAB node can be referred to as a former IAB node, a former access IAB node or a source IAB node; and the second IAB node can be referred to as a new IAB node, a new access IAB node or a new serving IAB node.

The received data can be 'in-flight' data, such as a BAP PDU, the initiation of the sending of which to the first/source IAB node (former access/serving IAB node for the UE) occurred prior to the UE's handover to the second/target IAB node (new access/serving IAB node for the UE).

In block 502, the first IAB node determines an address of a second IAB node that serves the UE. Such a determination can be based on/responsive to the first IAB node determining that it does not (i.e., it no longer) serves the UE.

In block 503, the first IAB node sends, based at least in part on the determined address of the second IAB node, the received data to the second IAB node.

The address of the second IAB node can comprise one or more selected from the group of:
  at least one address of the second IAB node in an IAB network;
  at least one BAP address;
  at least one routing identifier of the second IAB node in an IAB network; and/or
  at least one BAP routing identifier.

In some examples, the sending of the received data to the second IAB node comprises one or more selected from the group of:
  modifying a destination address of the received data;
  modifying a Backhaul Adaptation Protocol, BAP, routing identifier of the received data;
  modifying a Backhaul Adaptation Protocol, BAP, header of the received data;
  forwarding the received data to the second IAB node to transmit the information to the UE;
  forwarding the received data to the second IAB node via a wireless backhaul link; and forwarding the received data to the second IAB node via Backhaul, BH, Radio Link Control, RLC, channel.

In some examples, the first IAB node receives an indication of an association of the address of the second IAB node (e.g., its BAP address) and a cell identifier of the second IAB node (e.g., its Cell Global Identity, CGI). The first IAB node then stores, based at least in part on the received indication, information indicative of an association between the address of the second IAB node and the cell identifier of the second IAB node.

In some examples, the indication of an association of the address of the second IAB node and the cell identifier of the second IAB node is received by the first IAB node via one or more selected from the group of:
  at least one message of an F1 setup procedure;
  at least one message of an F1 Application Protocol;
  at least one routing configuration message;
  at least one routing update message; and
  at least one BAP Routing ID message.

In some examples, the first IAB node receives an indication that the UE is to be handed over from the first IAB node to the second IAB node. The first IAB node then stores, based at least in part on the received indication, information indicative of an association between the UE and the second IAB node.

In some examples, an association of a unique identifier of the UE (e.g., IP address or session ID for UE) with an identifier of the second IAB node (e.g., BAP address and/or CGI). The indication that the UE is to be handed over can be received in a message of a UE handover procedure, i.e., a UE CONTEXT MODIFICATION REQUEST message.

In some examples, the first IAB node receives an indication of an association of the UE and the address of the second IAB node. The first IAB stores, based at least in part on the received indication, information indicative of an association between the UE and the address of the second IAB node.

In some examples, the indication of an association of the UE and the address of the second IAB node is received by the first IAB node via one or more selected from the group of:
  at least one message of a UE handover procedure; and
  at least one UE CONTEXT MODIFICATION REQUEST message.

In some examples, the association of the UE and the address of the second IAB node is stored in a data structure at the first IAB node. For instance, the following information can be stored at the first IAB—an association of an ID of a handed over UE and the BAP address of the IAB to which the UE was handed over to.

In some examples, the determination of the address of the second IAB node is based at least in part on the stored information.

The first IAB node can remove the stored information (i.e., such as the stored association of an ID of a handed over UE and the BAP address of the IAB to which the UE was handed over to) based at least in part on one or more selected from the group of:
  an elapse of a predefined or dynamically determined time duration;
  a current load in a network to which the first IAB node belongs; and
  receipt of a control signal for removing the stored one or more entries.

In some examples the association is stored in a List of Recent Handovers, LRH data structure. An entry of LRH can contain a unique ID (e.g., IP address, session ID)

associated with the UE that has recently moved to another IAB node (of the same IAB-donor-CU) paired with the BAP address of that IAB node (i.e., the target cell/second IAB node).

Entries in the LRH can be removed using an expiry timer. The duration of this timer can be predefined for each IAB node (i.e., based on the expected average latency between the particular IAB node and the IAB donor), or the duration of the timer can be predefined according to the number of hops from the donor IAB node. Alternatively, the timer can Option 2. in a UE CONTEXT MODIFICATION REQUEST message.

For "Option 1", an information element, IE, of a BAP Routing ID message (e.g., as specified in TS 38.473, subsection 9.3.1.110), can be augmented with an additional optional field carrying the cell ID(s) corresponding to a BAP address.

Table 2 below shows an example of such a BAP Routing ID message is shown below, with a proposed modification to the same underlined:

| IE/Group Name | Presence | Range | IE type and reference | Semantics description |
|---|---|---|---|---|
| BAP Address | M | | TS 38.473 - 9.3.1.111 | |
| Path ID | M | | BAP Path ID TS 38.473 - 9.3.1.112 | |
| Cell ID List | | 0 . . . 1 | | |
| >Cell ID List Item | | 1 . . . <maxnoofCellperIABnode> | | |
| >>NR Cell Global Identifier (NR CGI) | O | | TS 38.473 - 9.3.1.12 | | be determined dynamically with respect to a current load in the network. In some examples, an entry in the LRH can be removed by an explicit indication from the CU. Such an indication can be based e.g., on the measurement report(s) from the UE.

Table 1 below shows an example of an LRH data structure:

| UE identifier | Address of the target cell | Expiry time |
|---|---|---|
| IP address | BAP address | Date and time |

As mentioned above, the first IAB node stores an association of a UE (which was formerly served by the first IAB node) and a target IAB node to which the UE has been handed over to. In this regard, the first IAB node (source IAB node) can store an ID of the UE and a BAP address of the second IAB node (target IAB node) the UE was handed over to.

The following is a discussion of how the first IAB node can obtain the BAP address of target IAB node.

An identifier (e.g., NR CGI) of a new serving/target cell (i.e., an NR CGI the target DU of the second IAB node) is communicated to the source DU of the first IAB node in a UE CONTEXT MODIFICATION REQUEST (which can be a message of an inter-gNB-DU mobility procedure for intra-NR). The first IAB node is able to determine a BAP address of the second IAB node that comprises the target cell/target DU having the received CGI to thereby enable the first IAB node to forward in-flight packets that the first IAB node receives to the second IAB node so that the new/target DU of the second IAB node can transmit the UE encapsulated data to the UE now served by the DU of the second IAB node.

The CU defines/determines the BAP addresses of the IAB nodes and is able to match the BAP address of each IAB node with the CGI of the DU/cell of each IAB node. The CU can inform the IAB nodes of the matching/association of BAP addresses to CGIs by one of the following options:

Option 1. via F1AP when configuring BAP routing entities at the IAB nodes of the IAB network of the gNB.

It is noted that:

Multiple cell IDs per one BAP address can be needed if an IAB node has multiple IAB-DU parts under one BAP address.

A CU does not need to provide cell IDs for all potential target IAB nodes. Instead, the CU can provide such information only when the direct forwarding of inflight packets (i.e., from the first IAB node to the second IAB node) is beneficial, e.g., where it can result in a lower latency than retransmission from the CU BAP addresses associations/pairings with respective cell ID(s) can be stored (and maintained) in an IAB node, for example, in a routing table.

After an IAB node has received a UE CONTEXT MODIFICATION REQUEST (specifying the cell ID of the target DU), it can check if there is an entry for the target cell ID in the routing table. If a matching entry is found, the IAB node can create a record in a List of Recent Handovers, LRH, for the UE to be handed over.

FIG. 6 is a flow diagram of a method 600 for the above described "Option 1", namely involving an enhanced BAP Routing ID message that is augmented with the NCGI(s) of the BAP address of the IAB nodes of the IAB network of a gNB.

In block 601, an IAB donor-CU configures a matching/association of BAP addresses of IAB nodes and NR CGIs of the DU(s) of the respective IAB nodes, and communicates the same to the IAB nodes. This can be effected, for example, via a BAP Routing ID message as per table 2 above, sent via F1AP when configuring BAP routing entities at the IAB nodes.

In block 602, a first IAB node receives an RRC Reconfiguration message, i.e., UE CONTEXT MODIFICATION REQUEST, in relation to a UE that is currently being served by the first IAB node and which specifies the target NCGI of the target DU the UE is to be handed over to.

In block 603, the first IAB node may be aware of the BAP address of the IAB node associated with the NGCI of the received UE CONTEXT MODIFICATION REQUEST (i.e., due to the previously received BAP Routing ID message received in block 601 which sets out a mapping of BAP addresses and respective NCGIs).

In block 604, if the first IAB node is aware of the BAP address of the IAB node associated with the NGCI of the received UE CONTEXT MODIFICATION REQUEST, it creates an entry in a List of Recent Handovers, e.g., as per table 1 above, and may optionally set an expiry timer for the removal/deletion of the entry.

In block 605, upon expiry of the timer or upon receipt of an explicit command from the CU, the entry is deleted from LRH.

In block 606, if the first IAB node is not aware of the BAP address of the IAB node associated with the NGCI of the received UE CONTEXT MODIFICATION REQUEST, no LRH related actions are required to be performed.

FIG. 7 is a flow diagram of a method 700 for the above described "Option 2", namely involving an enhanced UE CONTEXT MODIFICATION REQUEST message that is augmented with the BAP addresses of the IAB node that comprises the target DU that a UE is to be handed over to.

In block 701, a first IAB node receives an RRC Reconfiguration message, i.e., UE CONTEXT MODIFICATION REQUEST, in relation to a UE that is currently being served by the first IAB node and which specifies the target NCGI of the target DU the UE is to be handed over to.

As indicated in block 702, the UE CONTEXT MODIFICATION REQUEST may also indicate, via an optional IE, the BAP address of the IAB node that comprises the target DU that the UE is to be handed over to. In other words, the UE CONTEXT MODIFICATION REQUEST sets out both the target NCGI of the target DU as well as the BAP address of the associated second/target IAB node. Advantageously, the CU can control whether in-flight packets should be forwarded from the first/source IAB node to the second/target IAB node by deciding whether or not to add the optional IE in UE CONTEXT MODIFICATION REQUEST indicating the BAP address of the target IAB node.

In block 703, if the UE CONTEXT MODIFICATION REQUEST comprises the BAP address of the target IAB node in addition to the NCGI of the target DU, the first IAB node creates an entry in a List of Recent Handovers, e.g., as per table 1 above, and may optionally set an expiry timer for the removal/deletion of the entry.

In block 704, upon expiry of the timer or upon receipt of an explicit command from the CU, the entry is deleted from LRH.

In block 705, if the UE CONTEXT MODIFICATION REQUEST does not indicate the BAP address of the IAB node that comprises the target DU that the UE is to be handed over to, no LRH related actions are required to be performed.

Figures 8, 9:
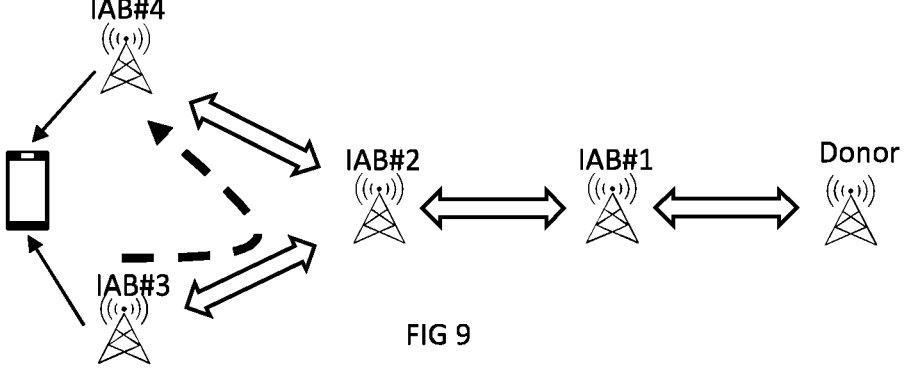
FIG. 8 shows another example of the subject matter described herein.
FIG. 9 shows another example of the subject matter described herein.

FIG. 8 is a flow diagram of a method 800 of the forwarding of received BAP PDU received by a first/source IAB to a second/target IAB following a handover of a UE from the first/source IAB to the second/target IAB.

In block 801, the first IAB node receives a BAP PDU addressed to the first IAB node, wherein the BAP PDU encapsulates PDCP PDU addressed to a UE.

In block 802, the first IAB node determines whether the UE (to whom the encapsulated PDCP PDU is addressed) is currently attached/served/hosted by the first IAB node.

In block 803, if the first IAB node is currently serving the UE, the PDCP PDU encapsulated in the received BAP PDU is sent to the UE, i.e., via the DU of the first IAB.

In block 804, if the first IAB node is not currently serving the UE, the first IAB node determines whether the UE is listed in a List of Recent Handovers, LRH, (which stores a list of UEs and BAP addresses of target IAB nodes that the UEs have been handed over to).

In block 805, if the UE is in the LRH, the first IAB node determines, based on the LRH, the BAP address of a target/second IAB node associated with the UE and forwards the BAP PDU to the target/second IAB node over the BAP layer (for the target/second IAB node to send the PDCP PDU encapsulated in the BAP PDU to the UE, i.e., via the DU of the target/second IAB node).

In block 806, if the UE is not in the LRH, the BAP PDU is discarded.

It is noted that the CU has to configure appropriate routes and BH RLC channel mapping at the IAB nodes (in advance) to enable the forwarding of BAP PDU packets over the BAP layer. In addition to the regular routes (when data routed from child IAB node to parent IAB node or vice versa—e.g., such as the in-flight packet forwarding from a parent IAB node to a child IAB node illustrated in FIG. 4), the delivering of the in-flight packets may require forwarding from one parent to another parent or from one child to another child.

FIG. 9 illustrates a further example, similar to that shown in FIG. 4, of a disaggregated (split) architecture gNB employing IAB technology and comprising a plurality of IAB nodes in communication, via backhaul RLC channels on each backhaul link, to an IAB-donor node. However, FIG. 9 shows a slightly different IAB network topology and UE handover in the same than that of FIG. 4.

It is noted that, in some examples, the CU has to configure appropriate routes and BH RLC channel mapping at IAB nodes (in advance) to enable the forwarding of BAP PDU packets from a child IAB node to a parent IAB node over the BAP layer.

In FIG. 4, the in-flight BAP PDU packet forwarding is from a source (parent) IAB node, IAB #3, to its child (target) IAB node IAB #4. Whereas, in FIG. 9, the in-flight BAP PDU packet forwarding is from a source (child) IAB node, IAB #3, to its parent IAB node, IAB #2, and the parent IAB node, IAB #2, then forwards the in-flight BAP PDU packet to its other child, i.e., the target IAB node (for the other child/target IAB node to deliver the encapsulated PDCP data to the UE).

In various examples, the CU of the IAB donor can have complete information about IAB network topology and may configure the forwarding of the in-flight PDUs if it can reduce the latency of delivery of the same to its destination (e.g., if the target IAB node is closer to the source IAB node than the CU). The CU may avoid retransmission of the in-flight PDUs towards the target IAB node, if their forwarding has been configured at the source IAB node. Alternatively, the forwarding of in-flight PDUs by the source IAB node can work in parallel with CU retransmission of the in-flight PDU (i.e., an opportunistic approach). In the latter case the copy of PDUs that arrive first at the target IAB node will be delivered to upper layers, while potential duplications will be filtered by the PDCP.

The forwarding of packets to the target node can be triggered e.g., when sending the HO command to the UE. As the DU does not have RRC layer, the CU can indicate when the HO command has been sent in an F1AP message.

Figure 10:
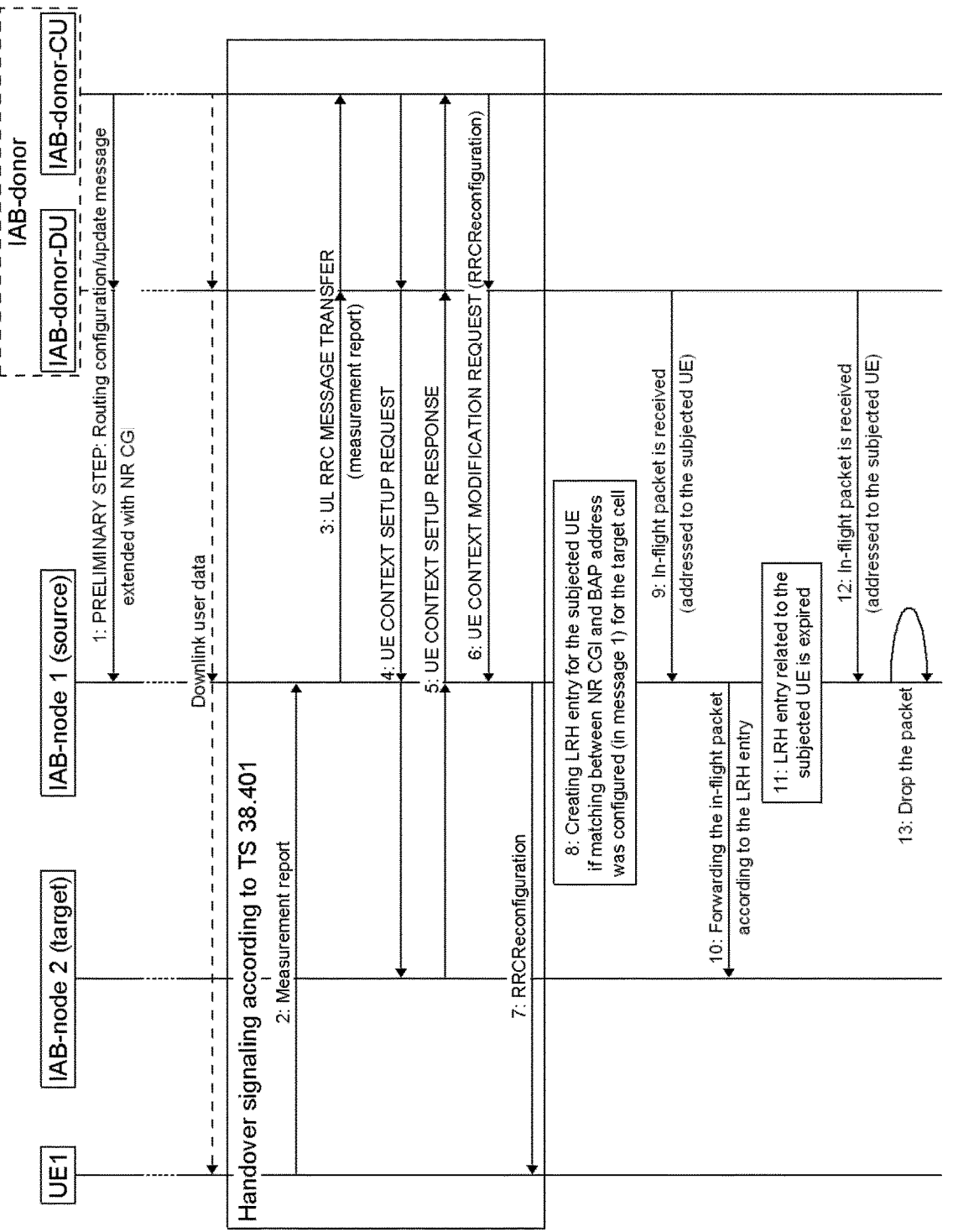
FIG. 10 shows another example of the subject matter described herein.

FIG. 10 is a signalling diagram of signalling, for the above mentioned "Option 1" (e.g., as illustrated with respect to FIG. 6), between nodes of a RAN, namely:

an IAB donor node (comprising an IAB donor-CU and an IAB donor-DU that can communicate with each other via an F1 interface), a source IAB node and a target IAB node (wherein the IAB nodes can communicate with each other via BH RLC channel links), and a UE (which can communicate with its access/serving IAB node via a Uu interface).

Various of the signalling of FIG. 10 may effect various of the method steps of FIG. 6. For instance:

block 601 can be effected via message 1 of FIG. 10—a routing configuration/update message that has been enhanced/augmented to include the NR CGI of the IAB nodes of the IAB network;

block 602 can be effected by message 6 of FIG. 10—a UE CONTEXT MODIFICATION REQUEST (RRC Reconfiguration) message;

block 604 can be effected by block 8 of FIG. 10—creating an LRH entry for the UE (i.e., the UE which is the subject of the UE CONTEXT MODIFICATION REQUEST) if there is a match between the NR CGI and BAP address (from message 1) and the NR CGI of a target cell (from message 6). The LRH entry stores an association of the UE with a BAP address of its target cell (i.e., the BAP address of the (new) target IAB node of the UE's (new serving) target cell). Then, if an in-flight PDU is received, via message 9, which is addressed to the UE (i.e., there is a match between a UE to whom a PDU is addressed and a UE listed in the LRH) the PDU is forwarded, via message 11, to the BAP address associated with the UE in the LRH; and block 605 can be effected by block 11 of FIG. 10—following expiry of a timer associated with the LRH entry, the LHR entry can be removed/deleted.

It is to be noted that the default handover signalling after message 7 (RRCReconfiguration) is not shown on the diagram to avoid confusion (such signalling running in parallel with signalling of the present disclosure). It is also to be noted that, in the alternative to or in addition to the removal of the LRH in step 11 upon expiry of a pre-determined period of time, the LRH entry can be removed by a dedicated command from the IAB-donor-CU (not shown).

Figure 11:
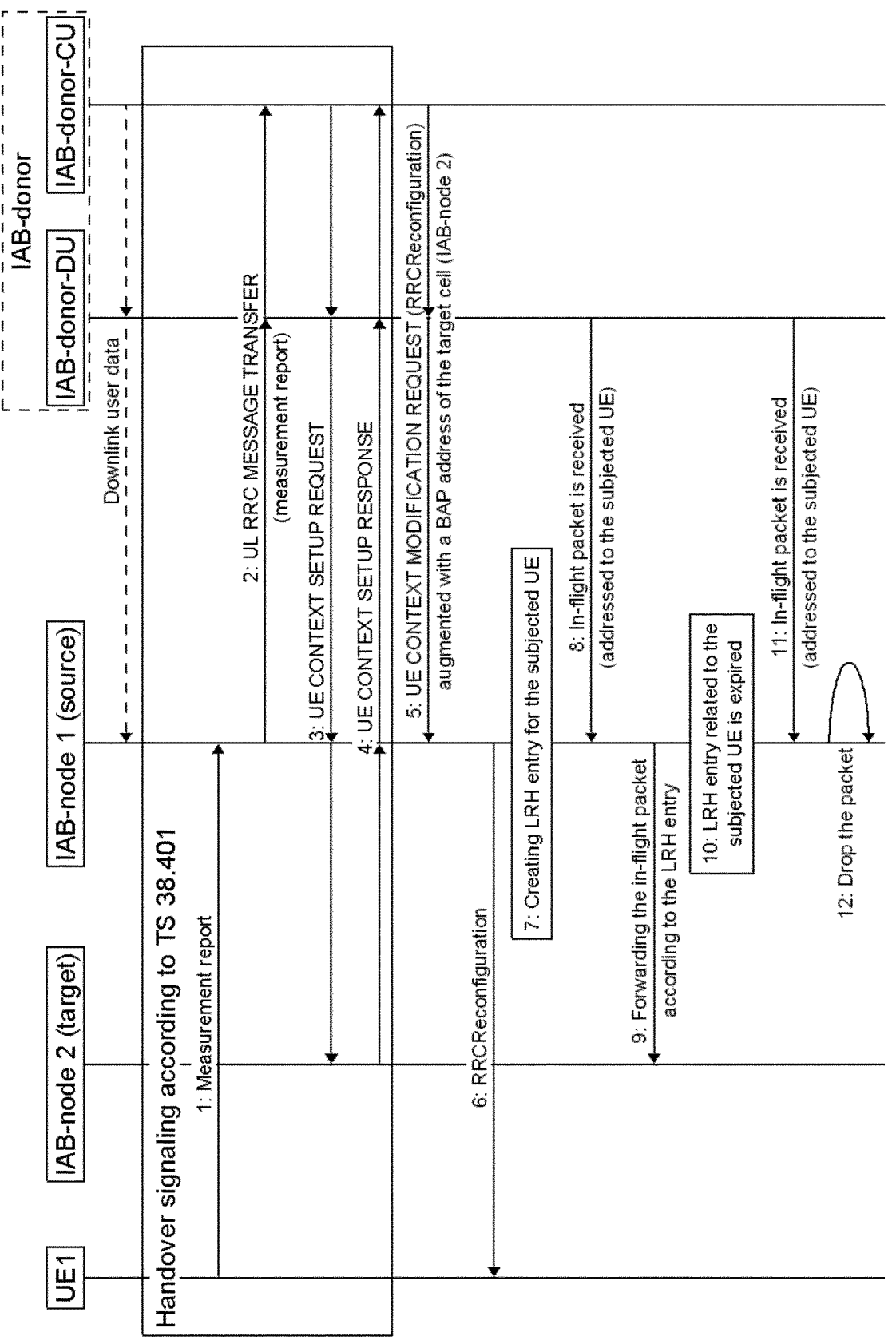
FIG. 11 shows another example of the subject matter described herein.

FIG. 11 is a signalling diagram of signalling, for the above mentioned "Option 2" (e.g., as illustrated with respect to FIG. 7), between nodes of a RAN, namely:

an IAB donor node (comprising an IAB donor-CU and an IAB donor-DU that can communicate with each other via an F1 interface), a source IAB node and a target IAB node (wherein the IAB nodes can communicate with each other via BH RLC channel links), and a UE (which can communicate with its access/serving IAB node via a Uu interface).

Various of the signalling of FIG. 11 may effect various of the method steps of FIG. 7. For instance:

blocks 701 and 702 can be effected via message 5 of FIG. 11—a UE CONTEXT MODIFICATION REQUEST (RRC Reconfiguration) message that has been enhanced/augmented to include the BAP address of the target cell/target IAB node; block 703 can be effected by block 7 of FIG. 11—creating an LRH entry for the UE (i.e., the UE which is the subject of the UE CONTEXT MODIFICATION REQUEST). The LRH entry stores an association of the UE with a BAP address of its target cell (i.e., the BAP address of the (new) target IAB node of the UE's (new serving) target cell provided in message 5). Then, if an in-flight PDU is received, via message 8, which is addressed to the UE (i.e., there is a match between a UE to whom a PDU is addressed and a UE listed in the LRH) the PDU is forwarded, via message 9, to the BAP address associated with the UE in the LRH; and block 704 can be effected by block 10 of FIG. 11—following expiry of a timer associated with the LRH entry, the LRH entry can be removed/deleted.

It is to be noted that the default handover signalling after message 6 (RRCReconfiguration) is not shown on the diagram to avoid confusion (such signalling running in parallel with signalling of the present disclosure). It is also to be noted that, in the alternative to or in addition to the removal of the LRH in step 10 upon expiry of a pre-determined period of time, the LRH entry can be removed by a dedicated command from the IAB-donor-CU (not shown).

FIG. 12 illustrates a potential use case of examples of the present disclosure, namely forwarding of in-flight DL packets to a target IAB-node when:

(i) the source and target IAB-nodes are connected to the same IAB-donor-CU and (ii) latency of delivering the in-flight packets over the direct forwarding is expected to be lower as compared to the latency of retransmission of the packets from the CU.

The example of FIG. 12 is similar to that shown in FIG. 4 in that it shows a disaggregated (split) architecture gNB employing IAB technology and comprising a plurality of IAB nodes in communication, via backhaul RLC channels on each backhaul link, to an IAB-donor node. In this example, a UE is handed over from a source IAB, IAB #3, to a target IAB, IAB #4.

To illustrate the benefits of examples of the present disclosure, let us assume a multi-hop IAB chain as shown in FIG. 12, wherein there is a constant latency of 5 ms associated with each hop. In this example, there is an in-flight DL (heading the source IAB #3) BAP PDU packet waiting for scheduling in the buffer of IAB #2. Retransmission of this packet from the CU would take at least 20 ms, while direct forwarding would take 10 ms.

Examples of the present disclosure are not limited to the forwarding of downlink inflight data. In some examples, uplink in-flight data may also be transmitted.

FIG. 13 shows an example wherein the forwarded data is uplink data rather than downlink data. In this example, UE1 and UE2 communicate locally (without involving the IAB donor) over the IAB network. Following a handover of UE1 from source IAB #3 to target IAB #4, there is an in-flight UL BAP PDU packet (encapsulating data for UE1 sent from UE2, wherein UE2 is attached to/served by IAB #1), heading to the source IAB #3, waiting for scheduling in the buffer of IAB #2. In accordance with the present disclosure, the BAP PDU can be forwarded to IAB #4 (for IAB #4 to transmit encapsulated data for UE1 to UE1) rather than the BAP PDU being re-transmitted.

Whilst the current state of IAB technology supports User Plane, UP, traffic only to/from IAB-donor, it is anticipated that in further releases IAB technology may be extended to local traffic (i.e., UP between two or more access IAB nodes of the same IAB donor CU. In such a case, examples of the present disclosure can be applicable for both UL and DL traffic. In various examples of the invention, in-flight data can be forwarded to a target cell using the proposed methodology presently described regardless of whether inflight data is UL or DL.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure have been described using flowchart illustrations, schematic block diagrams and signalling diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

FIG. 14 schematically illustrates a block diagram of an apparatus 10 for performing the methods, processes, procedures and signalling described in the present disclosure and illustrated in FIGS. 4-13. In this regard, the apparatus can perform the roles of: a RAN node, an IAB node, a CU of a RAN node, a source IAB node, a target IAB node, an IAB donor CU, or a UE. The component blocks of FIG. 14 are functional and the functions described can be performed by a single physical entity.

The apparatus comprises a controller 11, which could be provided within a device (not least such as: a RAN node, an IAB node, a CU of a RAN node, a source IAB node, a target IAB node, an IAB donor CU, or a UE).

The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 2-13. The processor 12 by reading the memory 13 is able to load and execute the computer program 14.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and illustrated in FIGS. 2-13. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a server device, a base station in a mobile cellular telecommunication system, a wireless communications device, etc. The apparatus can be embodied by a computing device, not least such as those mentioned above. However, in some examples, the apparatus can be embodied as a chip, chip set or module, i.e., for use in any of the foregoing.

In examples where the apparatus is provided within a first Integrated Access and Backhaul, IAB, the apparatus comprises:

at least one processor 12; and at least one memory 13 including computer program code;

the at least one memory 13 and the computer program code configured to, with the at least one processor 12, cause the apparatus at least to perform:

receiving data addressed to the first IAB node, wherein the received data comprises information to be transmitted to a User Equipment, UE;

determining, in response to determining that the first IAB node does not serve the UE, an address of a second IAB node that serves the UE; and sending, based at least in part on the determined address of the second IAB node, the received data to the second IAB node.

In examples where the apparatus is provided within a centralized unit of an access node for use in a disaggregated architecture comprising at least the centralized unit and a distributed unit, the apparatus comprises:

at least one processor 12; and at least one memory 13 including computer program code;

the at least one memory 13 and the computer program code configured to, with the at least one processor 12, cause the apparatus at least to perform:

sending, to a first Integrated Access and Backhaul, IAB, node, an indication of an association of an address of a second IAB node and:

either a cell identifier of the second IAB node, or a UE to be handed over to the second IAB node.

According to some examples of the present disclosure, there is provided a system (for example at least one IAB node and IAB donor CU).

The above described examples find application as enabling components of: telecommunication systems; tracking systems, automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IoT); Vehicle-to-everything (V2X), virtualized networks; and related software and services.

FIG. 15, illustrates a computer program 14 conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. An apparatus can receive, propagate or transmit the computer program as a computer data signal.

In certain examples of the present disclosure, there is provided computer program instructions for causing a first Integrated Access and Backhaul, IAB, to perform at least the following or for causing performing at least the following:

receiving data addressed to the first IAB node, wherein the received data comprises information to be transmitted to a User Equipment, UE;

determining, in response to determining that the first IAB node does not serve the UE, an address of a second IAB node that serves the UE; and sending, based at least in part on the determined address of the second IAB node, the received data to the second IAB node.

In certain examples of the present disclosure, there is provided computer program instructions for causing a centralized unit of an access node for use in a disaggregated architecture, comprising at least the centralized unit and a distributed unit, to perform at least the following or for causing performing at least the following:

sending, to a first Integrated Access and Backhaul, IAB, node, an indication of an association of an address of a second IAB node and:

either a cell identifier of the second IAB node, or a UE to be handed over to the second IAB node.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent. Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. A first node, which is a first Integrated Access and Backhaul (IAB) node, comprising:
   at least one processor; and
   at least one memory including computer program instructions;
   the at least one memory and the computer program instructions configured to, with the at least one processor, cause the apparatus at least to perform:
   receiving an indication of an association of a User Equipment (UE) and an address of a second node, wherein the second node is a second IAB node;
   storing, based at least in part on the received indication, information indicative of the association between the UE and the address of the second node;
   receiving data addressed to the first node, wherein the received data comprises information to be transmitted to the UE, and wherein the data is received following initiation of a handover of the UE from the first node to the second node;
   determining, in response to determining that the first node does not serve the UE, the address of the second node that serves the UE, wherein the address is determined based on the stored association between the UE and the address of the second node; and
   sending, based at least in part on the determined address of the second node, the received data to the second node.

2. The first node of claim 1, wherein the address of the first IAB node to which the data is addressed and the address of the second IAB node comprise one or more selected from the group of:
   Backhaul Adaptation Protocol, BAP, addresses; and
   BAP routing identifiers.

3. The first node of claim 1, wherein the data comprises one or more selected from the group of:
   at least one data packet;
   at least one Protocol Data Unit (PDU) of a Backhaul Adaptation Protocol (BAP);
   at least one BAP data packet; and
   a BAP layer encapsulation of the information to be transmitted to the UE.

4. The first node of claim 1, wherein sending the received data to the second IAB node comprises one or more selected from the group of:
   modifying a destination address of the received data;
   modifying a Backhaul Adaptation Protocol, BAP, routing identifier of the received data;
   modifying a Backhaul Adaptation Protocol, BAP, header of the received data;
   forwarding the received data to the second IAB node to transmit the information to the UE;
   forwarding the received data to the second IAB node via a wireless backhaul link; and
   forwarding the received data to the second IAB node via Backhaul (BH) Radio Link Control (RLC) channel.

5. The first node of claim 1, wherein the first node is caused to perform:

receiving an indication of an association of the address of the second IAB node and a cell identifier of the second IAB node; and
   storing, based at least in part on the received indication, information indicative of an association between the address of the second IAB node and the cell identifier of the second IAB node.

6. The first node of claim 5, wherein the indication of an association of the address of the second IAB node and the cell identifier of the second IAB node is received by the first IAB node via one or more selected from the group of:
   at least one message of an F1 setup procedure;
   at least one message of an F1 Application Protocol;
   at least one routing configuration message;
   at least one routing update message; and
   at least one BAP Routing ID message.

7. The first node of claim 1, wherein the first node is caused to perform:
   receiving an indication that the UE is to be handed over from the first IAB node to the second IAB node; and
   storing, based at least in part on the received indication, information indicative of an association between the UE and the second IAB node.

8. A method comprising causing, at least in part, actions that result in:
   receiving, by a first node, which is a first Integrated Access and Backhaul (IAB) node, an indication of an association of a User Equipment (UE) and an address of a second node, wherein the second node is a second IAB node;
   storing, based at least in part on the received indication, information indicative of the association between the UE and the address of the second node;
   receiving data addressed to the first node, wherein the received data comprises information to be transmitted to the UE, and wherein the data is received following initiation of a handover of the UE from the first node to the second node;
   determining, in response to determining that the first node does not serve the UE, the address of the second node that serves the UE, wherein the address is determined based on the stored association between the UE and the address of the second node; and
   sending, based at least in part on the determined address of the second node, the received data to the second node.

9. The method of claim 8, wherein the address of the first IAB node to which the data is addressed and the address of the second IAB node comprise one or more selected from the group of:
   Backhaul Adaptation Protocol, BAP, addresses; and
   BAP routing identifiers.

10. The method of claim 8, wherein the data comprises one or more selected from the group of:
   at least one data packet;
   at least one Protocol Data Unit (PDU) of a Backhaul Adaptation Protocol (BAP);
   at least one BAP data packet; and
   a BAP layer encapsulation of the information to be transmitted to the UE.

11. The method of claim 8, wherein sending the received data to the second IAB node comprises one or more selected from the group of:
   modifying a destination address of the received data;
   modifying a Backhaul Adaptation Protocol, BAP, routing identifier of the received data;

modifying a Backhaul Adaptation Protocol, BAP, header of the received data;

forwarding the received data to the second IAB node to transmit the information to the UE;

forwarding the received data to the second IAB node via a wireless backhaul link; and forwarding the received data to the second IAB node via Backhaul (BH) Radio Link Control (RLC) channel.

12. The method of claim 8, wherein the first node is caused to perform:

receiving an indication of an association of the address of the second IAB node and a cell identifier of the second IAB node; and storing, based at least in part on the received indication, information indicative of an association between the address of the second IAB node and the cell identifier of the second IAB node.

13. The method of claim 12, wherein the indication of an association of the address of the second IAB node and the cell identifier of the second IAB node is received by the first IAB node via one or more selected from the group of:

at least one message of an F1 setup procedure;

at least one message of an F1 Application Protocol;

at least one routing configuration message;

at least one routing update message; and at least one BAP Routing ID message.

14. The method of claim 8, comprising:

receiving an indication that the UE is to be handed over from the first IAB node to the second IAB node; and storing, based at least in part on the received indication, information indicative of an association between the UE and the second IAB node.

15. A non-transitory computer readable medium encoded with instructions that, when performed by at least one processor, causes at least the following to be perform:

receiving, by a first node, which is a first Integrated Access and Backhaul (IAB) node, an indication of an association of a User Equipment (UE) and an address of a second node, wherein the second node is a second IAB node;

storing, based at least in part on the received indication, information indicative of the association between the UE and the address of the second node;

receiving data addressed to the first node, wherein the received data comprises information to be transmitted to the UE, and wherein the data is received following initiation of a handover of the UE from the first node to the second node;

determining, in response to determining that the first node does not serve the UE, the address of the second node that serves the UE, wherein the address is determined based on the stored association between the UE and the address of the second node; and sending, based at least in part on the determined address of the second node, the received data to the second node.

16. The non-transitory computer readable medium of claim 15, wherein the address of the first IAB node to which the data is addressed and the address of the second IAB node comprise one or more selected from the group of:

Backhaul Adaptation Protocol, BAP, addresses; and

BAP routing identifiers.

17. The non-transitory computer readable medium of claim 15, wherein the data comprises one or more selected from the group of:

at least one data packet;

at least one Protocol Data Unit (PDU) of a Backhaul Adaptation Protocol (BAP);

at least one BAP data packet; and a BAP layer encapsulation of the information to be transmitted to the UE.

18. The non-transitory computer readable medium of claim 15, wherein sending the received data to the second IAB node comprises one or more selected from the group of:

modifying a destination address of the received data;

modifying a Backhaul Adaptation Protocol, BAP, routing identifier of the received data;

modifying a Backhaul Adaptation Protocol, BAP, header of the received data;

forwarding the received data to the second IAB node to transmit the information to the UE;

forwarding the received data to the second IAB node via a wireless backhaul link; and forwarding the received data to the second IAB node via Backhaul (BH) Radio Link Control (RLC) channel.

19. The non-transitory computer readable medium of claim 15, wherein the first node is caused to perform:

receiving an indication of an association of the address of the second IAB node and a cell identifier of the second IAB node; and storing, based at least in part on the received indication, information indicative of an association between the address of the second IAB node and the cell identifier of the second IAB node.

20. The non-transitory computer readable medium of claim 19, wherein the indication of an association of the address of the second IAB node and the cell identifier of the second IAB node is received by the first IAB node via one or more selected from the group of:

at least one message of an F1 setup procedure;

at least one message of an F1 Application Protocol;

at least one routing configuration message;

at least one routing update message; and at least one BAP Routing ID message.

* * * * *